3,151,180
PRODUCTION OF NORMALLY LIQUID OLEFINS
John W. Myers, Bartlesville, Okla., assignor to Phillips Petroleum Company, a corporation of Delaware
No Drawing. Filed July 15, 1960, Ser. No. 42,972
11 Claims. (Cl. 260—683.3)

This invention relates to a process for the conversion of aliphatic $C_6$ to $C_{20}$ paraffins to the corresponding olefins.

Platinum metal catalysts deposited on alumina of substantial surface area have been utilized in hydroforming and reforming operations in which gasoline boiling range hydrocarbons are increased in octane number. The principal improvement is effected by increasing the aromatic content of the feed by dehydrogenation of naphthenes and by dehydrocyclization of paraffins. A significant though lesser improvement in quality is effected by isomerization of paraffins to more branched structures with this type of catalyst.

The instant process is distinguished from the foregoing process in the use of a modified catalyst which minimizes the production of aromatics and produces olefins as the principal reaction. The present invention is thus not applicable to a reforming type of conversion.

Accordingly, it is an object of the invention to provide a process for converting $C_6$ to $C_{20}$ aliphatic paraffins to the corresponding olefins. Another object is to provide a process for converting aliphatic paraffins to the corresponding olefins without appreciable conversion of these paraffins to aromatics. A further object is to provide a process for converting a substantially pure feed consisting of aliphatic paraffins to the corresponding olefins. Other objects to the invention will become apparent upon consideration of the accompanying disclosure.

A broad aspect of the invention comprises contacting at least one $C_6$ to $C_{20}$ aliphatic paraffin at an elevated temperature with a catalyst consisting essentially of a platinum metal of the group Pt, Pd, and Rh deposited on an alumina having a surface area in the range of 0.01 to 5 square meters per gram so as to convert the paraffin to the corresponding olefin with relatively low aromatic production. The process is ordinarily effected at a pressure in the range of 0 (atmospheric) to 100 p.s.i.g., preferably 0 to 75 p.s.i.g., a temperature in the range of 850 to 1050° F., preferably 900 to 1000° F., and a liquid hourly space velocity in the range of 0.1 to 10, preferably 0.5 to 3. Hydrogen is not necessarily included in the reaction mixture but it improves the life of the catalyst and operation with $H_2$ present in a mol ratio of $H_2$ to hydrocarbon in the feed in the range of 0.5 to 10 and preferably 1 to 5 is desirable.

The alumina support is substantially alpha alumina of a surface area in the range of 0.01 to 5 square meters per gram, preferably 0.1 to 3 square meters per gram, and is generally prepared from higher surface area forms by heat treatment or calcination to reduce the surface area to the desired range. Gamma alumina and other forms of high surface area alumina may be calcined at high temperatures, such as 1800 to 2500° F. so as to convert the alumina to the alpha form and reduce the surface area to the required range. The catalyst is ordinarily used in fixed beds and in granular or pelleted form, although it is feasible to utilize same in finely comminuted form in fluidized beds. Fairly uniform particles 1/16 to about 3/8" size are satisfactory, pellets 1/8" by 1/8" being a preferred size.

A satisfactory method of preparing the catalyst comprises impregnating the low surface area support with an aqueous solution of a soluble platinum metal compound, such as chloroplatinic acid, to deposit the desired amount of metal on the support. The impregnated support is then dried and heated under reducing conditions to convert the platinum metal compound to a metal. The platinum metal content suitable for use in the process ranges from 0.01 to 5 weight per cent and, preferably, is in the range of 0.1 to 2 weight per cent. Platinum is preferred but palladium and rhodium are also effective in the process.

The process of the invention can be practiced with conventional catalytic apparatus and the olefins can be recovered from the reactor effluent by conventional recovery steps.

Paraffins ranging from $C_6$ to $C_{20}$, individually or in admixture, comprise suitable charge stocks for the process. Generally the $C_6$ to $C_{10}$ paraffins are utilized, as the corresponding olefins are more commonly used in chemical synthesis. However, the higher olefins such as hexadecene, and octadecene are useful in making detergent intermediates and these higher olefins can readily be made by the process. The feed to the process may also consist of a refinery stock having a high concentration, such as upwards of 30 or 40 per cent, of paraffins in the $C_6$ to $C_{20}$ range. However, it is preferred to utilize only these paraffins, unmixed with other hydrocarbons, as the feed.

The following example is set forth to illustrate the effectiveness of the process of the invention in converting paraffins of the class described, such as n-heptane, to the corresponding olefins with relatively low production of aromatics. The example is illustrative of the invention and is not to be construed as unnecessarily limiting the same.

*Example*

Runs were made contracting n-heptane with platinum-alumina catalysts made by inpregnation of alumina 0.4–0.5 weight percent of Pt on the alumina. The alumina supports were prepared by calcining gamma alumina to the specified surface areas in the table below. The carrier in run 5 was alpha alumina. Run conditions and product data are set forth in the table.

| Run number | 1 | 2 | 3 | 4 | 5[b] |
|---|---|---|---|---|---|
| Surface area of alumina support, sq.m./g | 174 | 174 | 104 | 47 | <1 |
| Average temperature, F | 923 | 932 | 930 | 956 | 959 |
| Pressure, p.s.i.g | 50 | 50 | 50 | 50 | 50 |
| LHSV | 3.2 | 1.1 | 1.1 | 1.1 | 1.1 |
| $H_2$/HC, mol ratio | 5.5 | 2.9 | 2.9 | 3.5 | 2.9 |
| $C_5+$ product yield, wt. percent | 92.6 | 71.2 | 73.2 | 71.6 | 96.4 |
| $C_6+$ product yield, wt. percent | | 63.9 | 65.5 | 63.7 | 95.3 |
| Aromatics in $C_6+$, LV percent | [a]21.5 | 98.0 | 87.7 | 75.2 | 1.9 |
| Olefins in $C_6+$, LV percent | [a]8.0 | 1.0 | 1.7 | 3.3 | 10.5 |

[a] These are in $C_5+$ product rather than $C_6+$ product.
[b] This catalyst contained 0.2 weight percent platinum.

It is evident from these data that the highest ratio of olefins to aromatics was obtained in the runs with the lowest surface area catalyst. The difference in this respect produced by the catalyst of run 5 as compared with the relatively low surface area alumina (47 sq. m./g.) of run 4 is significant.

Certain modifications of the invention will become apparent to those skilled in the art and the illustrative details disclosed are not to be construed as imposing unnecessary limitations on the invention.

I claim:

1. A process for converting $C_6$ to $C_{20}$ aliphatic paraffins to the corresponding olefins which comprises contacting at least one of said paraffins with a catalyst consisting essentially of alpha alumina having a surface area in the range of 0.01 to 5 square meters per gram and having deposited thereon a metal of the group consisting of Pt, Pd, and Rh at a pressure in the range of atmospheric to 100 p.s.i.g., a temperature in the range of 850 to 1050° F. and a liquid hourly space velocity in the range of 0.1 to 10 so as to convert a substantial portion of said paraffin to olefin without substantial conversion of paraffin to aromatic hydrocarbon.

2. The process of claim 1 wherein said at least one paraffin is in the range of $C_6$ to $C_{10}$.

3. The process of claim 1 wherein said surface area is in the range of 0.1 to 3 square meters per gram, said temperature is in the range of 900 to 1000° F., and said liquid hourly space velocity is in the range of 0.5 to 3.

4. The process of claim 3 wherein $H_2$ is admixed with the paraffin feed in a mol ratio of $H_2$ to hydrocarbon in the range of 1 to 5.

5. The process of claim 1 wherein $H_2$ is admixed with the paraffin feed in a mol ratio of $H_2$ to hydrocarbon in the range of 0.5 to 10.

6. The process of claim 1 wherein said metal is Pt.

7. The process of claim 1 wherein said metal is Pd.

8. The process of claim 1 wherein said metal is Rh.

9. The process of claim 3 using n-heptane as said paraffin and Pt as said metal.

10. The process of claim 1 wherein said metal is Pt, said surface area is less than one square meter per gram, said temperature is in the range of 900 to 1000° F., and said liquid hourly space velocity is in the range of 0.5 to 3.

11. The process of claim 10 wherein $H_2$ is admixed with the paraffin feed in a mol ratio of $H_2$ to hydrocarbon in the range of 1 to 5.

References Cited in the file of this patent

UNITED STATES PATENTS

| | | |
|---|---|---|
| 2,184,235 | Groll et al. | Dec. 19, 1939 |
| 2,479,110 | Haensel | Aug. 16, 1949 |
| 2,550,531 | Ciapetta | Apr. 24, 1951 |
| 2,800,518 | Pitzer | July 23, 1957 |